Figure 1:
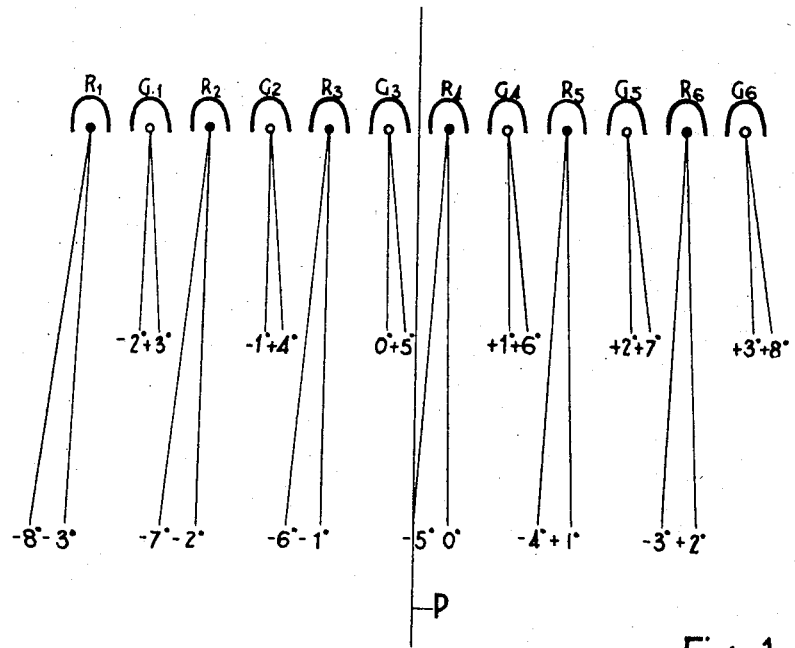

Jan. 10, 1961     H. M. FERGUSON ET AL     2,968,023
VISUAL POSITION-INDICATING ARRANGEMENTS
Filed Aug. 21, 1956     3 Sheets-Sheet 1

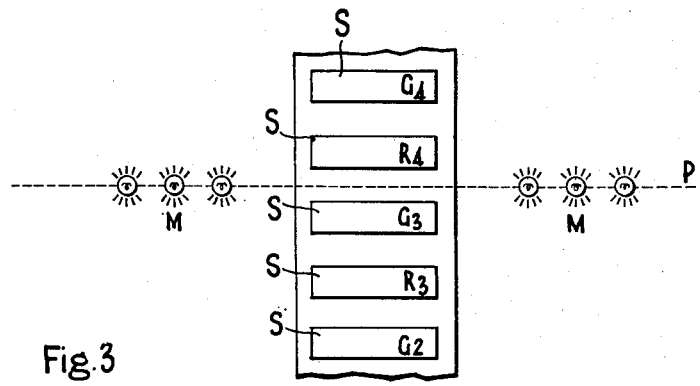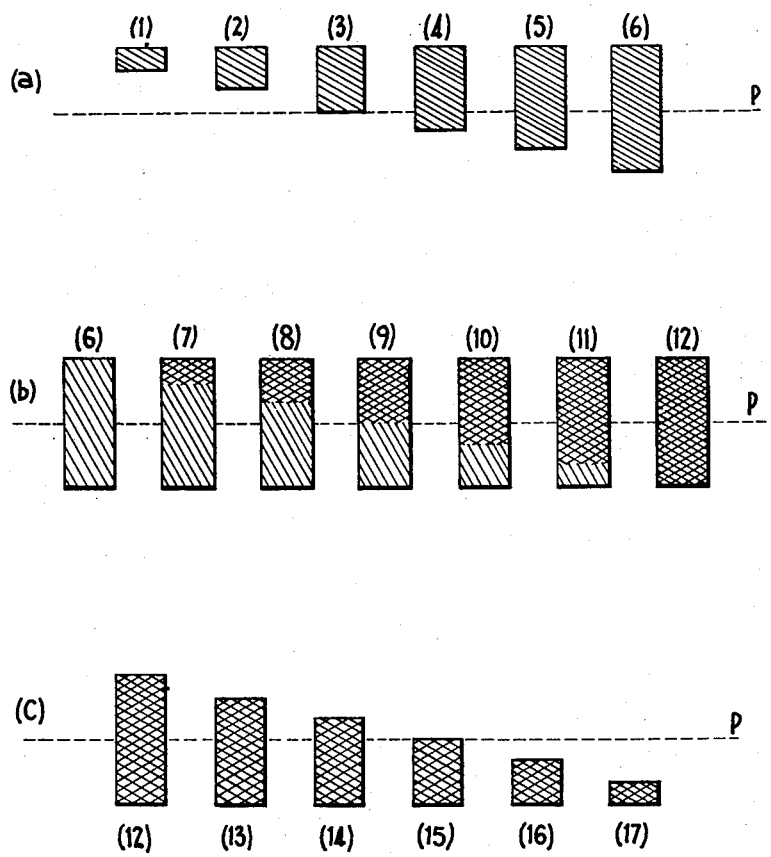
Fig. 3
Fig. 4

United States Patent Office 2,968,023
Patented Jan. 10, 1961

2,968,023

VISUAL POSITION-INDICATING ARRANGEMENTS

Harold Matthew Ferguson, Hatch End, and Walter Robert Stevens, Pinner Hill, England, assignors to The General Electric Company Limited, London, England Filed Aug. 21, 1956, Ser. No. 605,344

6 Claims. (Cl. 340—26)

This invention relates to arrangements for providing an observer approaching a location with a visual indication of his position with respect to the location relative to a particular plane, hereinafter referred to as the approach plane, passing through the location. More particularly, through not exclusively, the invention relates to arrangements for providing the pilot of an aircraft approaching a landing ground with a visual indication of the position of the aircraft relative to an approach plane passing through the landing ground, for assisting landing of the aircraft. The landing grounds with which the invention is particularly, though not exclusively, concerned are the flight decks of aircraft carriers, and one main object of the invention is to provide an improved arrangement of the kind referred to for guiding an aircraft landing on the deck to a landing position at which the aircraft will safely be arrested by engagement with arrester wires extending across the deck. In the latter case the approach plane mainly of interest is a plane inclinded to the flight deck at an angle giving the correct angle of approach to the deck for landing. In other cases, for example with airfields on the land, the approach plane may be a vertical plane extending along the centre of a landing strip. It will, however, be appreciated that more than one approach plane each provided with a separate visual indicating arrangement may be associated with any particular location. Thus in the case of an aircraft carrier as aforesaid, one approach plane may be indicated for guiding aircraft into line with the flight deck and another approach plane indicated for guiding aircraft to the flight deck at the correct angle of approach.

According to the invention, an arrangement for providing an observer approaching a location with a visual indication of his position relative to an approach plane passing through the location, includes at said location a plurality of light sources each arranged in operation of the arrangement to project a beam of light into a working region of the arrangement bounded by two planes inclined to and including between them said approach plane, each beam being of relatively narrow beam angle, as compared with the angle between said boundary planes, in planes perpendicular to said approach plane, said light sources are arranged in two distinguishable groups in each of which the light beams from the sources in the group are directed so that their centre lines in said perpendicular planes have progressive angular displacements relative to each other about an axis parallel to said approach plane, so that each beam overlaps all the other beams in the group in said perpendicular planes and so that at least the greater number of centre lines of the beams in the group are directed to one side of the approach plane, the sense of the said displacements and the side of the approach plane to which the centre lines of the beams are mainly directed being different for the two groups, and the light sources are spaced apart so as to be separately visible to the observer when the latter is in the path of two or more of the light beams within the working region of the arrangement.

The term "separately visible" does not necessarily mean that an observer in the path of the light beams from two or more sources can resolve the individual sources, but merely that they occupy different spatial positions in his field of view; thus in some cases the two or more sources might appear to be contiguous and merged into each other to give the effect of a continuous line of light whose length depends on the number of light sources being seen.

In some cases the progressive angular displacements of the centre lines of the light beams may be effected by a displacement of one side only of each beam, so that the beam widths progressively vary, but for maintaining uniform light intensity with similar light sources it will in general be preferable to keep the beam widths constant and displace each side of the beams equally.

It will be appreciated that in some cases the plurality of light sources may be derived from a single lamp or a relatively small number of lamps by suitable optical arrangements.

It may be arranged that the beams in each group all extend wholly away from the approach plane, so that the indication given when an observer is within a predetermined angular deviation from the plane is that none of the light sources are visible. Such an arrangement has, however, the disadvantage that an accidental extinction of the light sources might give rise to a false indication being conveyed to an observer, and it will usually be desirable for at least one beam in each group to extend along one side, or partly on both sides, of the approach plane.

The light sources in the two groups may be arranged to be distinguishable in any suitable way; for example they may be of different colours, or occupy different spatial positions, or be flashed at different rates.

The number of light sources of each group seen by an observer approaching the location will vary in a predetermined sequence according to the side of the approach plane on which he lies and his angular displacement relative to that plane, and the information obtained by observing the number and nature of the light sources will thus enable him to alter his course if necessary so as to move into the said particular plane, or to maintain a required course relative to it.

The number of light sources in each group, their relative spacing, and the angular width, in planes perpendicular to the approach plane, of the beams produced by them, which are suitable for any particular arrangement in accordance with the invention, will depend on the angular deviation from the approach plane, and on the distance from the location, at which the indication afforded by the arrangement is to be recognisable by an observer and on the sensitivity required, that is to say the rate at which the indication is required to change with change in the position of the observer towards or away from the approach plane. For increasing the sensitivity near the approach plane the effective angular displacements of the said centres of the beams directed at the smaller angles to that plane may be arranged to be smaller than those of the centres of the beams directed at the greater angles to the plane.

The angular width of the beams in planes parallel to the approach plane might be relatively large or relatively small as may be required. For example where the directions of approach of the observer lie substantially in a plane, as when he is moving on the surface of land or the sea, the said angular width need only be small, but where the movements of the observer are three dimensional, as when he is in an aircraft, it will usually be desirable for said angular width to be relatively large.

The spacing between the light sources will in general be small compared with the distance at which the indication to the observer is required to be given.

Another factor to be considered is the speed at which the indication given has to be interpreted by the observer for any particular use of an arrangement in accordance with the invention. Thus, for example, for a ship being guided by the arrangement on to a particular course into a harbour, the relatively slow speed of the ship will permit a relatively slow observation of the light sources and consultation, if necessary, with a code book. On the other hand for an observer in an aircraft approaching a landing ground at a relatively high speed it is essential that the indication be immediately interpretable, and a particular object of the invention is to provide a preferred form of arrangement in accordance with the invention as aforesaid which can be designed so as to be suitable for such use.

In this preferred form of the invention the two groups of light sources are arranged in alternate sequence along a line transverse to the approach plane and in each group progressive angular displacements of both sides of the beams in the group are effected such that each of the beams from the light sources lying on one side of the approach plane extends wholly to that side of the approach plane whilst the beams from the light sources in the group which lie on the other side of the approach plane extend partly on both sides of the approach plane, said one side of the approach plane being the opposite for the two groups.

With this arrangement an observer approaching the location at a sufficient distance from one side of the approach plane will first see only the light sources of one group; as he moves nearer to the approach plane he will pass into a region at which he enters the beam from the light source of the other group which is at the end of the line sequence on the same side of the approach plane as that from which he is approaching.

As he then approaches the plane and departs from it on the other side the number of the light sources of this other group he will see will increase whilst those of the first group will decrease until eventually he is so far to the other side that he can only see light sources of this other group. Within these extremes the pattern of the light sources he can see along the line sequence at any time will give the observer a visual indication of his angular position relative to the approach plane. By the use of a marker, such as a marking light, at a fixed position along the line sequence, especially at the intersection of the approach plane with the line sequence, the configuration of the pattern relative to the marker can be arranged to give an immediately interpretable indication.

The nature of the indication provided will depend on the widths and orientations of the beams from the light sources. With a symmetrical arrangement the indication that the observer is in or very close to the approach plane will be the observance of equal numbers of the light sources from the two groups, departure from the approach plane to one side or the other being indicated by an increase in the number of light sources from one group which are seen and a decrease in the number of light sources from the other group which are seen. In addition the boundary between the light sources of the two groups will move towards or away from the approach plane in the same sense as the observer moves towards or away from the approach plane, and by placing a relatively fixed marker at the intersection of the approach plane with the line sequence of light sources an instantly interpretable indication of the change in the observer's position relative to the approach plane can be obtained.

Figure 2:
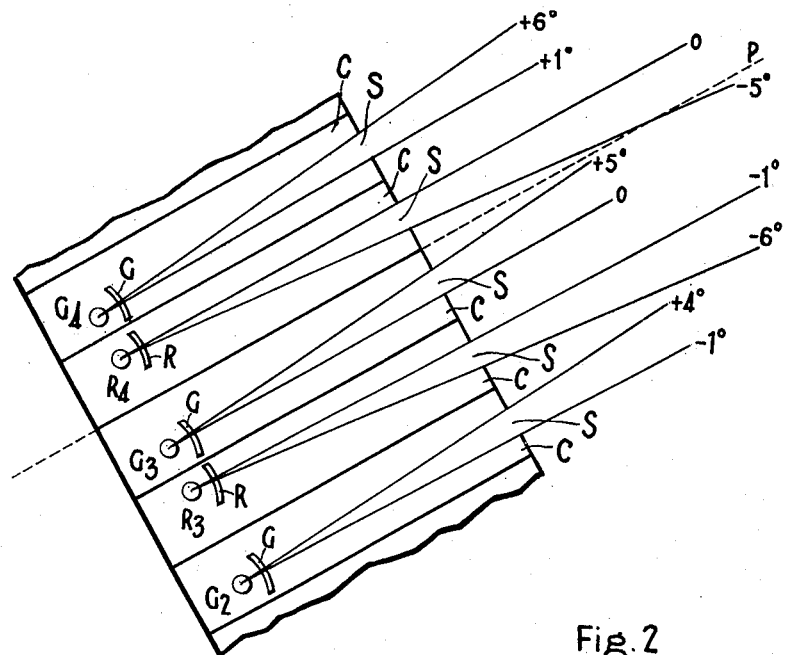
Figure 5:
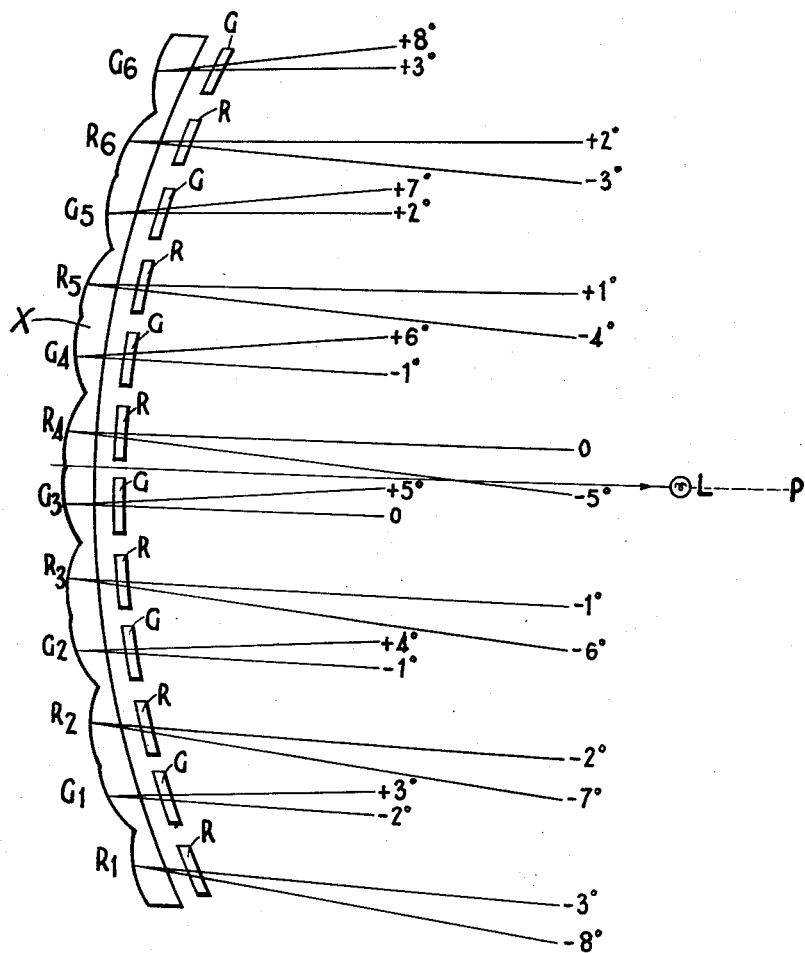

The invention will be further explained with reference to the accompanying drawings, in which Figure 1 represents a schematic plan view of an example of the preferred form of the invention, Figures 2 and 3 represent respectively a schematic side sectional view and schematic front view of a practical form of the arrangement of Figure 1, Figure 4 includes diagrams explanatory of the operation of the embodiment shown in Figures 2 and 3, and Figure 5 represents a schematic side sectional view of a further embodiment of the invention.

Referring now to Figure 1, this shows an arrangement of twelve light sources arranged in two groups of six in alternate sequence along a line perpendicular to the approach plane P, which extends perpendicular to the plane of the drawing.

The light sources $R_1$ to $R_6$ of one group are arranged to project narrow beams of light mainly to the left-hand side, looking towards the sources, of the plane P, which will be regarded as the negative side, and are characterised by a red colour. The light sources $G_1$ to $G_6$ of the other group are arranged to project narrow beams of light mainly to the right-hand side of the plane P, which will be regarded as the positive side, and are characterised by a green colour.

The angular width of all the beams is the same, namely 5°, and the beams are oriented to direct light between the following angles:

$R_1$ between —8° and —3°   $G_1$ between —2° and +3°
$R_2$ between —7° and —2°   $G_2$ between —1° and +4°
$R_3$ between —6° and —1°   $G_3$ between 0° and +5°
$R_4$ between —5° and —0°   $G_4$ between +1° and +6°
$R_5$ between —4° and +1°   $G_5$ between +2° and +7°
$R_6$ between —3° and +2°   $G_6$ between +3° and +8°

The arrangement is designed for giving an indication to an observer when he is within +8° of the approach plane, measured from the centre of the line sequence, with a particular indication of his angular position relative to the approach plane within an angle of ±2°.

An observer approaching the plane P from the left will first see the red light from $R_1$ when he is within 8° of the approach plane; the red light will indicate that he is too far to the left and as he moves further towards the approach plane he will see in additional succession each of the other red light sources until just before he is within 3° of the plane P he will see all the red light sources in a line.

At 3° the red light source $R_1$ disappears, and at 2° the red light source $R_2$ replaced by the green light source $G_1$. At 1° the red light source $R_3$ is replaced by the green light source $G_2$ and this replacement is continued until after the observer has crossed the approach plane P and is just beyond 2° to it he sees only the green light sources $G_1$ to $G_5$ and none of the red light sources.

When the observer is correctly positioned in the approach plane P he will see three of the red light sources all to the right and thre of the green light sources all to the left.

If there are a sufficient number of the light sources and they are closely spaced, an observer will see them as a bar of light which appears completely red when he is to the left of the approach plane and begins to change to green from the left as he approaches the plane until the bar is half red and half green when he is in the plane. If he moves away from the plane to the right the green coloured part of the bar will increase in extent to the right until all the bar appears green if he is sufficiently far to the right. By adjusting his position so as to keep the bar of light half green and half red as he approaches the light sources the observer can ensure that he remains in the correct plane of approach.

It will be appreciated that since it is not possible in practice to obtain a perfectly sharp beam cut off, there will in general be some overlap between the red beams and green beams at the replacement angles, so that adjacent light sources may be simultaneously visible to the observer; this will produce the effect of a whitish region at the junction between the red and green portions of the total bar of light visible to the observer. The position of this whitish region relative to the centre of the bar, which may be denoted by a visible marker, such as a marker light, may then afford a further aid to the observer for quickly establishing his position relative to the approach plane.

As implied by the above reference to the use of a marker light, an arrangement in accordance with the invention might include light sources additional to those which provide the two groups of mutually overlapping light beams. In particular, in the example described with reference to Figure 1 the two groups providing definitely mutually overlapping light beams are respectively the light sources $R_2$, $R_3$, $R_4$, $R_5$, $R_6$ and $G_1$, $G_2$, $G_3$, $G_4$ and $G_5$, and the light sources $R_1$ and $G_6$ can be regarded as providing "pick-up lights" for enabling an observer who is approaching from outside the boundaries of the working field of the arrangement to detect the field quickly and be guided towards the region about the approach plane in which the colour change effect comes into operation; more than one such "pick-up light" might be provided at each end of the arrangement if required. Alternatively, since in the example described the adjacent sides of the beams from $R_1$ and $R_6$ are directed at the same angle (—3°) to the approach plane and it is in practice impossible to obtain a perfectly sharp beams cut-off, there will be some overlap between $R_1$ and $R_6$, and $R_1$ can be regarded as included within the group of red light sources. Similarly $G_1$ can be regarded as included within the group of green light sources in this example.

It will be appreciated that in the foregoing description the terms "left" or "right" should be interpreted as "lower" or "upper," or vice versa, in the case where the approach plane is inclined to the vertical, as in the case of an arrangement for guiding aircraft down on to the flight deck of an aircraft carrier. In the latter case it is of primary importance to prevent an aircraft approaching the deck at too low an angle, which may cause it to crash into the side of the ship below the level of the flight deck, and by arranging the red light sources to project their beams mainly below the approach plane it is arranged that the appearance of a preponderance of red light on the observed bar of light will signal to the pilot of an aircraft that his angle of approach is too low.

By flashing the lights in the two groups in alternate time sequence the indication afforded by them may be rendered more quickly interpretable in some cases, and the use of such flashing may in other cases suffice for giving the required indication without the use of different colours for the lights in the two groups.

It will be appreciated that the line of light sources need not necessarily extend at right angles to the approach plane so long as the required arrangement of light beams is produced; for example in the case of an approach plane inclined to the deck of an aircraft carrier as aforesaid, it might be more convenient to arrange the light sources on the flight deck along a line perpendicular to and extending across the line in which the approach plane intersects the deck.

Also in some cases the two groups of light sources may be slightly displaced to opposite sides of the line along which they are arranged in order to render the indication given by the light sources more readily visible.

For increasing the sensitivity of the indication near the approach plane, the angular separation between the beams of the light sources in each group near the centre of the line may be made smaller than those towards the ends of the line.

The number of light sources, the beam angles provided by them, and their spacing will depend on the distance at which the indication is required to be observable. We have found that with the arrangement of twelve light sources shown in Figure 1, with a spacing of 2 inches between the centre of adjacent light sources, a clear indication was observed up to a range of about 300 yards.

The light sources used in any arrangement in accordance with the invention may be of any suitable kind which will produce a sharply defined beam of relatively small angle in one plane and relatively wide angle in a perpendicular plane.

In carrying the invention into practice, one convenient method of producing the required sharply defined beams is by the use of lamps arranged behind narrow slits in an opaque screen, the light sources provided by the lamps being of small dimensions in the direction transverse to the length of the slits and being spaced from the slits at a distance at which the angle subtended at the longitudinal edges of the slits by the said transverse dimension of the light sources is very small, for example only a fraction of a degree, so as to obtain a suitably sharp beam cut-off.

Figures 2 and 3 of the accompanying drawing illustrate schematically the carrying into practice in this way of the embodiment of the invention shown in Figure 1 in the case where the approach plane is inclined at an angle to the horizontal, for example for aircraft landing purposes. For convenience in the preparation of the drawing only the central part of the arrangement has been shown.

Figure 2 represents a section through the arrangement at right angles to the approach plane, denoted by P, and Figure 3 represents a front view of the arrangement looking along the approach plane.

The light sources $R_1$ to $R_6$ and $G_1$ to $G_6$, of which only $R_3$, $R_4$ and $G_2$, $G_3$, $G_4$ appear in the drawing, consist of projection type filament lamps designed for horizontal burning and are mounted in separate light-tight compartments C, each behind a colour filter G or R for producing green or red light respectively. Each compartment has an opaque front panel carrying a horizontally arranged slit S, and the lamps are positioned with respect to the slits to provide light beams of the required beam width and direction, together with a suitably sharp beam cut-off.

For example, if the lamps are each adapted to dissipate 1000 watts and the width of each light source transverse to the slits is one half inch, the slits might conveniently be 5 inches wide and 20 inches long and the lamps spaced at a distance of 50 inches from the slits, with the distance between the centres of adjacent slits about 12 inches.

The interiors of the compartments C are blackened for preventing strong light from detracting from the sharpness of the beam cut-offs, and suitable cooling means (not shown) for the arrangement are provided.

For marking the intersection of the approach plane with the line of light sources, a horizontal line of filament lamps M, backed by a reflector (not shown) giving a wide beam angle in all directions with light of a colour other than green or red, for example yellow or white, can if desired be arranged on each side of the arrangement midway between the slits corresponding to the light sources $G_3$ and $R_4$ as shown in Figure 3, although the use of such marker lights is not essential.

Figure 4 of the accompanying drawing indicates the general nature of the successive appearances presented by the arrangement to an observer as he crosses the approach plane from above to below, the observer being at such a distance from the arrangement that adjacent light sources are not resolvable by him. Each light source is seen as a bar of coloured light, green light being indicated in the drawing by single line shading and red light by cross hatching.

The sequence (a), including the diagrams (1) to (6), indicates at (1) the "pick-up" green light first seen by the observer, which tells him that he is within the range of the arrangement and above the approach plane, and at (2) to (6) the additive succession of green lights seen by the observer as he moves nearer to the approach plane. The effect seen is that a bar of green light extends in length towards the approach plane P, indicated by the marker lights if provided (not shown in Figure 3), and extends across the plane equally to its other wide, as at (6).

The sequence (b), including the diagrams (6) to (12), indicates the changes seen by the observer over the critical region on each side of the approach plane where he needs guidance. At (7) the upper end of the green bar of light changes to red, and the length of the red portion increases until when the observer is in the approach plane the bar is half red and half green as indicated at (9). As his distance below the approach plane increases the length of the red portion increases until finally the bar appears all red, as at (12).

The sequence (c), including the diagrams (12) to (17), indicates how the length of the red bar contracts to the lower side of the approach plane as the observer's distance below the plane increases, until finally the "pick-up" red light at (17) is seen.

The reverse changes take place as the observer crosses the approach plane from below to above, and the observer's task is to position himself so that he always sees a bar of light which is half red and half green, as in diagram (9). A preponderance of green light in the bar indicates that he is too high and a preponderance of red light that he is too low.

It will be appreciated that between the conditions corresponding to diagrams (6) and (7) the actual length of the observed line of light sources contracts when the light source $R_1$ is no longer seen by the observer and then expands again when the first green light source $G_1$ becomes visible, and vice versa, but this irregularity will not in general be noticed in the bar of light seen by the observer and in any case where it might have a disturbing effect, this can be avoided or minimised by arranging the light sources $R_1$, $R_2$ and $G_2$ relatively closely together. Similar remarks apply in respect of the transitions between the conditions corresponding to diagrams (12) and (11), and any disturbing effect can be avoided or minimised if necessary by grouping the light sources $G_5$, $G_6$ and $R_6$ relatively closely together.

If an arrangement giving a higher light intensity than that readily obtainable by the use of lamps and slits in the manner just described is required, this can be effected by the use of optical beam-forming arrangements in conjunction with one or more lamps of suitably high power.

In one arrangement of this kind illustrated schematically in Figure 5 of the accompanying drawing, an elongated light source L is arranged parallel to the axis of a cylindrical mirror X so as to define an approach plane P passing through the light source and through the parallel centre line of the mirror. The mirror is formed with longitudinal ribs extending parallel to its axis, each rib forming a separate cylindrical reflector for producing a beam of light of the required beam width from the light source, adjacent ribs being arranged to reflect light to different sides of the approach plane so as to produce two different groups of overlapping beams, and the median planes of successive ribs in each group being inclined to the approach plane at progressively different angles for producing the progressive angular displacements of the light beams, the ribs being denoted by the reference characters $R_1$ to $R_6$ and $G_1$ to $G_6$ and giving a distribution of light beams similar to the distribution obtained with the light sources so referenced in Figure 1 of the drawing.

The lamp light source L, which can be provided by one or more lamps of suitably high power, is positioned from the mirror at a distance relative to the radial width of the lamp light source which will produce reflected beams of the required beam width. The light beams in the two groups are arranged to be differently coloured by associating colour filters R and G with the corresponding ribs of the mirror.

In a modified form of this arrangement, two lamps emitting light of different colours, for example red and green, are displaced one to each side of the approach plane, and the mirror ribs are each arranged to produce a beam of light from each lamp, the directions of the two beams being controlled for forming the required groups of overlapping beams by giving the median planes of the ribs a suitable inclination to the approach plane.

It will be appreciated that in either of these arrangements the individual ribs of the mirror serve as elongated light sources in an arrangement in accordance with the invention.

We claim:

1. An arrangement for providing an observer approaching a location with a visual indication of his position relative to an approach plane passing through the location, including at said location two groups of plural light sources, each group having a common optical characteristic, the characteristics of the two groups being distinguishable, said light sources being arranged in alternate sequence of the groups along a line transverse to the approach plane, each light source being arranged to project a beam of light into a working region of the arrangement bounded by two planes inclined to and including between them said approach plane, each beam being of relatively narrow beam angle as compared with the angle between said boundary planes in planes perpendicular to said approach plane, wherein in each group of light sources the light beams are directed (1) so that the center lines of the beams in said perpendicular planes have progressive angular displacements relative to each other about an axis parallel to said approach plane, (2) so that each beam overlaps all the other beams in the same group, and (3) so that at least the greater number of the center lines of the beams in the same group are directed to one side of the approach plane, the sense of the said displacements and the side of the approach plane to which the center lines of the beams are mainly directed being different for the two groups, and wherein the plural light sources are spaced apart so as to be separately visible to the observer when the latter is in the paths of two or more of the light beams within the working region of the arrangement, the pattern of light sources of the two groups seen along the line sequence by the observer providing the required visual indication.

2. An arrangement according to claim 1 wherein in each group of plural light sources progressive angular displacements of both sides of the beams produced by the same group are effected such that each of the beams from the light sources lying on one side of the approach plane extends wholly on that side of the approach plane while the beams from the light sources in the group which lie on the other side of the approach plane extend partly on both sides of the approach plane, said one side of the approach plane being the opposite for the two groups.

3. An arrangement according to claim 2, wherein the two groups of light sources are distinguishable by virtue of the emission of light of different colors, and the two groups contain the same number of light sources, wherein the arrangement of the sources in the one group in one direction across the approach plane is the same as the arrangement of the sources in the other group in the other direction across the approach plane, and wherein the light sources are so closely spaced as to be just not resolvable, so that the pattern of the line sequence seen by the observer is a bar of light colored differently at each end, a position in the approach plane being indicated by equal lengths of the bar appearing in each color and a position away from the approach plane being indicated by a preponderant length of one or the other color, according to the direction away from the approach plane.

4. An arrangement according to claim 3, wherein a relatively fixed marker which is visible to an observer anywhere within the working region of the arrangement is placed at the intersection of the approach plane with the line sequence of plural light sources so that the position relative to the marker of the junction of the two differently colored parts of the observed bar of light indicates the position of the observer relative to the approach plane.

5. An arrangement according to claim 2, wherein a plurality of the light sources are obtained from a single lamp by an optical arrangement producing a plurality of images of the lamp.

6. An arrangement according to claim 3 for guiding aircraft on to a landing strip, wherein the approach plane is inclined to the vertical and the line sequence of the two groups of light sources is arranged to indicate the correct angle of approach of the aircraft to the landing strip.

References Cited in the file of this patent

UNITED STATES PATENTS

| | | |
|---|---|---|
| 2,023,708 | Spring | Dec. 10, 1935 |
| 2,039,812 | Lieb | May 5, 1936 |
| 2,431,240 | Gausch | Nov. 18, 1947 |
| 2,441,877 | Flett | May 18, 1948 |
| 2,458,414 | Penton | Jan. 4, 1949 |
| 2,475,256 | Saint | July 5, 1949 |
| 2,497,427 | Weiss | Feb. 14, 1950 |
| 2,498,294 | Pennow | Feb. 21, 1950 |
| 2,582,742 | Bartow | Jan. 15, 1952 |
| 2,597,321 | Hergenrother | May 20, 1952 |

FOREIGN PATENTS

| | | |
|---|---|---|
| 341,354 | Italy | June 22, 1936 |